US012726509B2

(12) United States Patent
Narayanan et al.

(10) Patent No.: US 12,726,509 B2
(45) Date of Patent: Sep. 1, 2026

(54) GENERATIVE ARTIFICIAL INTELLIGENCE ("GenAI") CYBERSECURITY SYSTEM

(71) Applicant: Bank of America Corporation, Charlotte, NC (US)

(72) Inventors: Rajesh Narayanan, Chennai Tamil Nadu (IN); Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 128 days.

(21) Appl. No.: 18/914,508

(22) Filed: Oct. 14, 2024

(65) Prior Publication Data

US 2026/0106887 A1 Apr. 16, 2026

(51) Int. Cl.
*H04L 9/40* (2022.01)

(52) U.S. Cl.
CPC ...... *H04L 63/1441* (2013.01); *H04L 63/0428* (2013.01); *H04L 63/1416* (2013.01)

(58) Field of Classification Search
CPC ............. H04L 63/1441; H04L 63/0428; H04L 63/1416
See application file for complete search history.

(56) References Cited

U.S. PATENT DOCUMENTS

| | | | | | |
|---|---|---|---|---|---|
| 7,003,560 | B1 * | 2/2006 | Mullen | G06Q 10/06 | 709/224 |
| 7,735,116 | B1 * | 6/2010 | Gauvin | H04L 63/102 | 713/153 |
| 8,397,242 | B1 * | 3/2013 | Conover | G06F 8/52 | 718/1 |
| 8,689,333 | B2 * | 4/2014 | Aziz | H04L 63/1491 | 726/24 |
| 8,776,229 | B1 * | 7/2014 | Aziz | H04L 63/0245 | 713/193 |
| 8,881,282 | B1 * | 11/2014 | Aziz | G06F 21/554 | 726/23 |
| 8,914,406 | B1 * | 12/2014 | Haugsnes | G06F 9/45558 | 710/316 |
| 9,027,135 | B1 * | 5/2015 | Aziz | G06F 21/554 | 726/23 |
| 9,225,730 | B1 * | 12/2015 | Brezinski | G06F 21/00 | |
| 9,584,488 | B2 * | 2/2017 | Thompson | H04L 63/0428 | |
| 9,609,003 | B1 * | 3/2017 | Chmielewski | H04L 67/025 | |

(Continued)

*Primary Examiner* — Aravind K Moorthy
(74) *Attorney, Agent, or Firm* — Weiss & Arons LLP

(57) ABSTRACT

A multi-layer, auto-preventative and auto-reactive, cybersecurity system for auto-preventing cybersecurity intruders and auto-reacting to intrusions by cybersecurity intruders is provided. Such a system may operate within a computing network environment. Such a system may include a plurality of auto-preventative layers. The auto-preventative layers may be designed to prevent intrusion of intruders from entering the network. Such a system may also include a plurality of auto-reactive layers. The plurality of auto-reactive layers may be designed to identify intruders once the intruders have penetrated the system and isolate such intruders. The auto-reactive layers may provide data to the auto-preventative layers in order to prevent future intrusions. Both the auto-preventative layers and the auto-reactive layers may harness the capabilities of quantum computing and GenAI to maintain the security of the network.

10 Claims, 6 Drawing Sheets

(56) References Cited

U.S. PATENT DOCUMENTS

| | | | | | |
|---|---|---|---|---|---|
| 9,635,011 | B1 * | 4/2017 | Wu | H04L 63/0807 | |
| 9,681,360 | B1 * | 6/2017 | Salyers | H04W 12/64 | |
| 9,762,610 | B1 * | 9/2017 | Kwan | H04L 63/20 | |
| 9,935,977 | B1 * | 4/2018 | Tribble | H04L 63/12 | |
| 10,075,459 | B1 * | 9/2018 | Suryanarayanan | H04L 63/1416 | |
| 10,084,813 | B2 * | 9/2018 | Eyada | H04L 63/1416 | |
| 10,178,109 | B1 * | 1/2019 | Miskovic | H04L 63/1416 | |
| 10,742,420 | B1 * | 8/2020 | Griffin | H04L 9/3093 | |
| 11,063,961 | B1 * | 7/2021 | Heydari | G08G 5/21 | |
| 11,184,157 | B1 * | 11/2021 | Gueron | H04L 9/14 | |
| 11,295,583 | B1 * | 4/2022 | Bansal | H04N 7/188 | |
| 11,412,384 | B1 * | 8/2022 | Southern | H04W 4/025 | |
| 12,229,265 | B1 * | 2/2025 | Yeung | G06F 21/566 | |
| 12,273,392 | B1 * | 4/2025 | Yang | H04L 63/20 | |
| 12,401,675 | B2 * | 8/2025 | Andriani | H04L 63/1416 | |
| 12,418,554 | B1 * | 9/2025 | Saxena | H04L 63/1425 | |
| 12,598,207 | B2 * | 4/2026 | Warake | H04L 63/1433 | |
| 2002/0026345 | A1 * | 2/2002 | Juels | G06Q 50/188 | 705/37 |
| 2005/0257265 | A1 * | 11/2005 | Cook | G06F 21/566 | 726/23 |
| 2005/0257266 | A1 * | 11/2005 | Cook | G06F 8/61 | 726/23 |
| 2005/0273857 | A1 * | 12/2005 | Freund | H04L 63/1416 | 726/23 |
| 2007/0192865 | A1 * | 8/2007 | Mackin | G06F 21/55 | 726/24 |
| 2007/0256127 | A1 * | 11/2007 | Kraemer | H04L 63/1408 | 726/23 |
| 2008/0222734 | A1 * | 9/2008 | Redlich | H04L 9/3271 | 726/26 |
| 2008/0262991 | A1 * | 10/2008 | Kapoor | H04L 63/14 | 706/20 |
| 2009/0066788 | A1 * | 3/2009 | Baum | H04L 12/2818 | 375/E7.076 |
| 2010/0005531 | A1 * | 1/2010 | Largman | G06F 21/53 | 726/24 |
| 2011/0099620 | A1 * | 4/2011 | Stavrou | G06F 21/566 | 726/12 |
| 2011/0238855 | A1 * | 9/2011 | Korsunsky | H04L 63/1441 | 709/231 |
| 2012/0240185 | A1 * | 9/2012 | Kapoor | H04L 41/0866 | 726/1 |
| 2012/0297457 | A1 * | 11/2012 | Schulte | H04L 65/1069 | 726/4 |
| 2013/0298244 | A1 * | 11/2013 | Kumar | G06F 21/51 | 726/25 |
| 2014/0013434 | A1 * | 1/2014 | Ranum | G06F 21/564 | 726/24 |
| 2014/0167928 | A1 * | 6/2014 | Burd | H04L 12/2825 | 340/12.5 |
| 2015/0058976 | A1 * | 2/2015 | Carney | H04L 63/1408 | 726/22 |
| 2015/0067858 | A1 * | 3/2015 | Loriot | H04L 63/1433 | 726/23 |
| 2015/0074810 | A1 * | 3/2015 | Saher | H04L 63/1466 | 726/23 |
| 2015/0180894 | A1 * | 6/2015 | Sadovsky | H04W 12/12 | 726/22 |
| 2015/0358359 | A1 * | 12/2015 | Ghai | G06F 21/604 | 726/23 |
| 2016/0057166 | A1 * | 2/2016 | Chesla | H04L 63/1416 | 726/22 |
| 2016/0218933 | A1 * | 7/2016 | Porras | H04L 41/147 | |
| 2016/0285824 | A1 * | 9/2016 | Carames | G06F 21/53 | |
| 2016/0308841 | A1 * | 10/2016 | Singhvi | H04L 63/0281 | |
| 2016/0366183 | A1 * | 12/2016 | Smith | H04L 63/06 | |
| 2017/0063785 | A1 * | 3/2017 | Durniak | H04L 63/0428 | |
| 2017/0094521 | A1 * | 3/2017 | Salyers | H04W 48/04 | |
| 2017/0111391 | A1 * | 4/2017 | Chao | H04L 63/1416 | |
| 2017/0214701 | A1 * | 7/2017 | Hasan | H04L 63/1433 | |
| 2017/0243028 | A1 * | 8/2017 | LaFever | G06F 21/6254 | |
| 2017/0244745 | A1 * | 8/2017 | Key | H04L 63/1408 | |
| 2017/0250954 | A1 * | 8/2017 | Jain | H04L 63/0254 | |
| 2017/0289191 | A1 * | 10/2017 | Thioux | H04L 63/1441 | |
| 2017/0310702 | A1 * | 10/2017 | Chantz | H04L 63/1441 | |
| 2017/0346851 | A1 * | 11/2017 | Drake | H04L 9/0838 | |
| 2017/0353324 | A1 * | 12/2017 | Baum | H04L 67/125 | |
| 2017/0374084 | A1 * | 12/2017 | Inoue | H04L 63/1433 | |
| 2018/0131716 | A1 * | 5/2018 | Chantz | H04L 63/1425 | |
| 2018/0302373 | A1 * | 10/2018 | Ezell | H04L 67/1036 | |
| 2018/0337899 | A1 * | 11/2018 | Becker | H04L 63/0428 | |
| 2019/0052675 | A1 * | 2/2019 | Krebs | H04L 63/1416 | |
| 2019/0098039 | A1 * | 3/2019 | Gates | G16H 50/20 | |
| 2019/0121962 | A1 * | 4/2019 | Coleman | H04L 63/083 | |
| 2019/0132214 | A1 * | 5/2019 | Porras | H04L 63/20 | |
| 2019/0141015 | A1 * | 5/2019 | Nellen | H04L 63/0272 | |
| 2019/0213618 | A1 * | 7/2019 | Ahluwalia | H04L 67/564 | |
| 2019/0394216 | A1 * | 12/2019 | Kondamuri | H04L 63/1416 | |
| 2020/0186548 | A1 * | 6/2020 | Alagar | H04L 63/145 | |
| 2020/0228505 | A1 * | 7/2020 | Lapidous | H04L 63/166 | |
| 2020/0274697 | A1 * | 8/2020 | Ragan | H04L 63/06 | |
| 2020/0329072 | A1 * | 10/2020 | Dubois | G08B 21/18 | |
| 2020/0356667 | A1 * | 11/2020 | Rodriguez Bravo | G06F 21/316 | |
| 2020/0358798 | A1 * | 11/2020 | Maylor | H04L 63/1433 | |
| 2021/0167953 | A1 * | 6/2021 | Islam | H04L 9/3242 | |
| 2021/0194925 | A1 * | 6/2021 | Xiao | H04L 63/0227 | |
| 2021/0232707 | A1 * | 7/2021 | Wilson | H04L 9/3218 | |
| 2021/0248226 | A1 * | 8/2021 | Coady | G06F 21/53 | |
| 2021/0306375 | A1 * | 9/2021 | Patel | G06F 21/53 | |
| 2021/0312047 | A1 * | 10/2021 | Chen | H04L 9/0858 | |
| 2021/0344485 | A1 * | 11/2021 | Levin | H04L 9/0825 | |
| 2021/0352087 | A1 * | 11/2021 | Ryver | H04L 9/0852 | |
| 2021/0400060 | A1 * | 12/2021 | Chacko | H04L 63/1416 | |
| 2022/0006835 | A1 * | 1/2022 | Gray | H04L 9/0838 | |
| 2022/0012334 | A1 * | 1/2022 | Ghosh | G06F 21/556 | |
| 2022/0060498 | A1 * | 2/2022 | Head, Jr. | H04L 12/4641 | |
| 2022/0182413 | A1 * | 6/2022 | Benson | H04L 9/085 | |
| 2022/0189242 | A1 * | 6/2022 | Petersen | H04W 12/50 | |
| 2022/0232020 | A1 * | 7/2022 | Kandachar Sridhara Rao | H04L 63/1466 | |
| 2022/0239675 | A1 * | 7/2022 | Panse | H04L 63/1416 | |
| 2022/0239681 | A1 * | 7/2022 | Newman | G06F 11/3006 | |
| 2022/0263842 | A1 * | 8/2022 | Chen | H04L 63/1416 | |
| 2022/0272109 | A1 * | 8/2022 | Szurdi | G06F 21/12 | |
| 2022/0330027 | A1 * | 10/2022 | Djukic | H04L 47/2475 | |
| 2022/0417295 | A1 * | 12/2022 | Klotz | H04L 67/12 | |
| 2023/0011397 | A1 * | 1/2023 | Panse | H04L 63/20 | |
| 2023/0016852 | A1 * | 1/2023 | Salamon | H04L 63/083 | |
| 2023/0047965 | A1 * | 2/2023 | Renes | G09C 1/00 | |
| 2023/0060207 | A1 * | 3/2023 | Sirineni | H04L 67/60 | |
| 2023/0087297 | A1 * | 3/2023 | Ghosh | H04L 9/0825 | 713/168 |
| 2023/0115064 | A1 * | 4/2023 | Salamon | H04L 49/9057 | 370/392 |
| 2023/0123781 | A1 * | 4/2023 | Kaimal | H04L 43/50 | 726/12 |
| 2023/0179569 | A1 * | 6/2023 | Giralte | H04L 63/1458 | 726/1 |
| 2023/0188335 | A1 * | 6/2023 | Lamas Linares | H04L 63/0428 | 713/168 |
| 2023/0199017 | A1 * | 6/2023 | Chacko | H04L 63/1433 | 726/22 |
| 2023/0208649 | A1 * | 6/2023 | Perlman | H04L 9/3236 | 713/156 |
| 2023/0216882 | A1 * | 7/2023 | Ryver | G06N 10/80 | 726/22 |
| 2023/0231860 | A1 * | 7/2023 | Tian | H04L 63/1416 | 726/1 |
| 2023/0247055 | A1 * | 8/2023 | Castro de Rosa | H04L 63/20 | 726/3 |
| 2023/0254133 | A1 * | 8/2023 | He | H04L 63/0428 | 713/153 |
| 2023/0259632 | A1 * | 8/2023 | Marciano | G06F 21/554 | 726/25 |
| 2023/0261859 | A1 * | 8/2023 | Bryden | H04L 9/3215 | 713/168 |
| 2023/0261990 | A1 * | 8/2023 | Chacko | H04L 63/0272 | 709/238 |

(56) References Cited

U.S. PATENT DOCUMENTS

2023/0262077 A1* 8/2023 Palmer ................ H04L 63/1441 726/13
2023/0319071 A1* 10/2023 Durbin ................ H04L 63/1466 726/23
2023/0319097 A1* 10/2023 Murphy ................ G06F 21/566
2023/0396596 A1* 12/2023 Hall .................... H04L 63/0428
2023/0403257 A1* 12/2023 Chen ................... H04L 63/0245
2023/0409737 A1* 12/2023 Khare ................ G06V 30/1801
2023/0410545 A1* 12/2023 Slensker ................ G06V 40/10
2023/0412621 A1* 12/2023 Khare ................. H04L 63/1425
2023/0421582 A1* 12/2023 McCarthy ........... H04L 63/1425
2023/0421592 A1* 12/2023 Parsacala ................ H04L 41/16
2024/0028760 A1* 1/2024 Salamon ............. G06F 21/6245
2024/0086558 A1* 3/2024 Jadhav ................ G06F 21/6218
2024/0111821 A1* 4/2024 Dogaru ................... G06F 21/53
2024/0121228 A1* 4/2024 Underwood ........ H04L 63/0435
2024/0129338 A1* 4/2024 Azad ................... H04L 63/1416
2024/0129745 A1* 4/2024 Doken .................... G06F 1/163
2024/0177160 A1* 5/2024 Kaul ...................... G06N 10/40
2024/0195612 A1* 6/2024 Kundu .................. H04L 63/029
2024/0275608 A1* 8/2024 Cook .................... H04L 9/3247
2024/0314169 A1* 9/2024 Azad ................... H04L 63/1416
2024/0323163 A1* 9/2024 Goehring ............ H04L 63/0209
2024/0333737 A1* 10/2024 Shahrivar ........... H04L 63/1425
2024/0348626 A1* 10/2024 Marzorati ........... H04L 63/1416
2024/0388434 A1* 11/2024 Griffin .................. H04L 9/3213
2024/0406210 A1* 12/2024 Sellars .................. G06F 21/554
2024/0414184 A1* 12/2024 Barai .................. H04L 63/1416
2025/0016179 A1* 1/2025 Chen ................... H04L 63/1416
2025/0016180 A1* 1/2025 Mitin .................. H04L 63/1416
2025/0039090 A1* 1/2025 Paschick ................. H04L 12/66
2025/0039161 A1* 1/2025 Gangadharappa ...... H04L 63/08
2025/0039196 A1* 1/2025 Crabtree ............... H04L 43/028
2025/0039228 A1* 1/2025 Crabtree ............. H04L 63/1425
2025/0080547 A1* 3/2025 Sinks .................. H04L 63/0227
2025/0097005 A1* 3/2025 Stapleton .................. H04L 9/14
2025/0126147 A1* 4/2025 Koral .................. H04L 63/1416
2025/0133066 A1* 4/2025 Rangaraj ............... H04L 9/0869
2025/0133101 A1* 4/2025 Rao ..................... H04L 63/1416
2025/0265333 A1* 8/2025 Singh .................... G06F 21/554
2025/0280017 A1* 9/2025 Navarrete Discua ........................ H04L 63/1416
2025/0293868 A1* 9/2025 Soulhi ................... H04L 9/0861
2025/0294045 A1* 9/2025 Lee ..................... H04L 63/1425
2025/0300969 A1* 9/2025 Bailey ................... H04L 63/126
2026/0061705 A1* 3/2026 Leendertse ........... B29C 64/393
2026/0095464 A1* 4/2026 Palanki ............... H04L 63/1416

* cited by examiner

AN EXEMPLARY MULTI-LAYER SYSTEM DESIGN DATA PATH

PREVENTATIVE LAYER 1
Use GenAI to create an updatable profile for intruders.
Use GenAI to create an updatable profile for authentic users.

402

PREVENTATIVE LAYER 2
Use Quantum Computing to create prevention processes for intruders.
Use Quantum Computing to create entry processes for authentic users.

404

REACTIVE LAYER 1
Use quantum computing to sever a connection between an intruder and a data segment.

406

REACTIVE LAYER 2
When intruder is in sandbox, record interactions between intruder and sandbox.

408

410
DATA

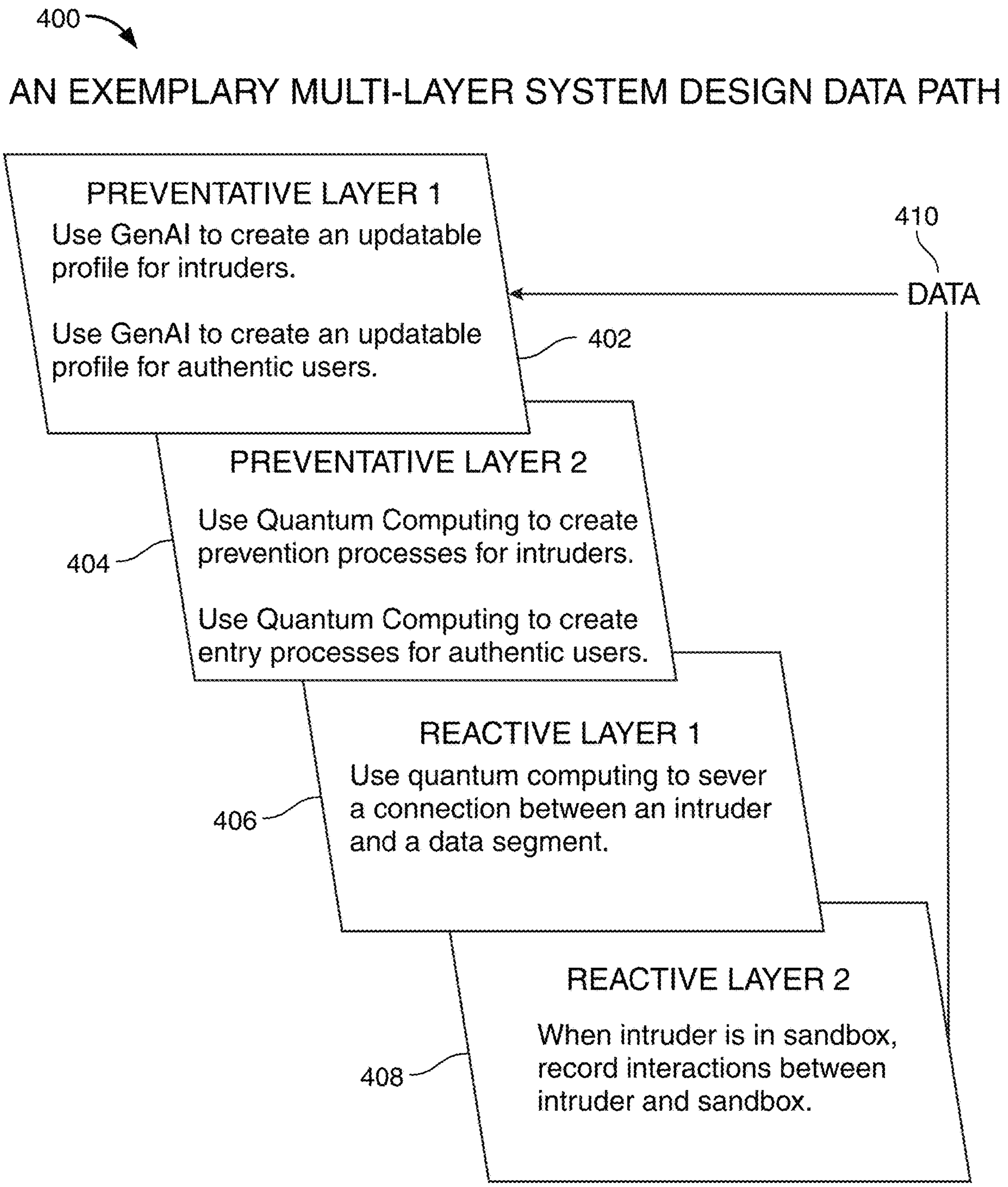

FIG. 4

GENERATIVE ARTIFICIAL INTELLIGENCE ("GenAI") CYBERSECURITY SYSTEM

FIELD OF TECHNOLOGY

Aspects of the disclosure relate to artificial intelligence.

BACKGROUND OF THE DISCLOSURE

Continuously updating security measures are needed to maintain security on continuously changing technology.

As such, it may be desirable to harness the capabilities of GenAI and Quantum computing to provide heightened security to existing technologies.

SUMMARY OF THE DISCLOSURE

Cybersecurity systems may be provided. Such cybersecurity systems may include a hybrid model of quantum computing and GenAI.

Such cybersecurity systems may be designed in a multi-layer system design. The multi-layer system design may provide potential and/or attempted intrusion prevention.

The multi-layer system may include both a preventative—i.e., proactive—and/or reactive approach. As such, the multi-layer system design may include preventative layers—i.e., proactive layers—that prevent intruders from entering a system. The multi-layer system design may also include reactive layers that identify intruders and isolate such intruders.

The preventative layers may include enclosures and/or boundaries that prevent intrusion from an unauthorized user. Such preventative layers may include GenAI and/or quantum computing capabilities. For example, the barriers may utilize data from within the system, and data extracted from sources outside the system, to determine and authenticate the identity of the user. GenAI may harness data collected from outside sources to create a profile for each of the users.

The reactive layers may include an obscure data layer. As such, once an intruder has been identified as authenticated within the computing network environment, the obscure data layer may create an obscure data set. At times, the obscure data set may be created and stored at a time prior to the intruder authenticating within the system. The obscure data set may be similar to authentic data. However, the obscure data set may include mocked-up, or simulated data.

When the obscure data layer identifies the intruder, the obscure data layer may cut the connection between the intruder and the authentic data. Upon severing the connection between the intruder and the authentic data, the obscure data layer may redirect the intruder, absent the intruder's knowledge, to a network location that includes obscure data. Such a process, including severing the connection between the intruder and the authentic data, and seamlessly redirecting the intruder to the authentic data may be termed forced hallucination.

The obscure data layer may generate a false trail away from sensitive or authentic data. At times, the trail can lead an intruder to a technical sandbox. The technical sandbox may include the obscure data. The technical sandbox may monitor the actions of the intruder during the intruder's interactions within the technical sandbox. The monitored interactions between the intruder and the technical sandbox may be transmitted to a GenAI proactive layer.

The GenAI proactive layer may utilize the monitored interactions as training data. GenAI, within the GenAI proactive layer, trained on the monitored interactions, may identify and prevent future intruders. As such, the technical sandbox may provide data to enable the multi-layer system to identify and prevent potential intruders from entering the system.

BRIEF DESCRIPTION OF THE DRAWINGS

The objects and advantages of the invention will be apparent upon consideration of the following detailed description, taken in conjunction with the accompanying drawings, in which like reference characters refer to like parts throughout and in which:

FIG. 4 shows still another illustrative diagram in accordance with principles of the disclosure;

DETAILED DESCRIPTION OF THE DISCLOSURE

Figure 1:
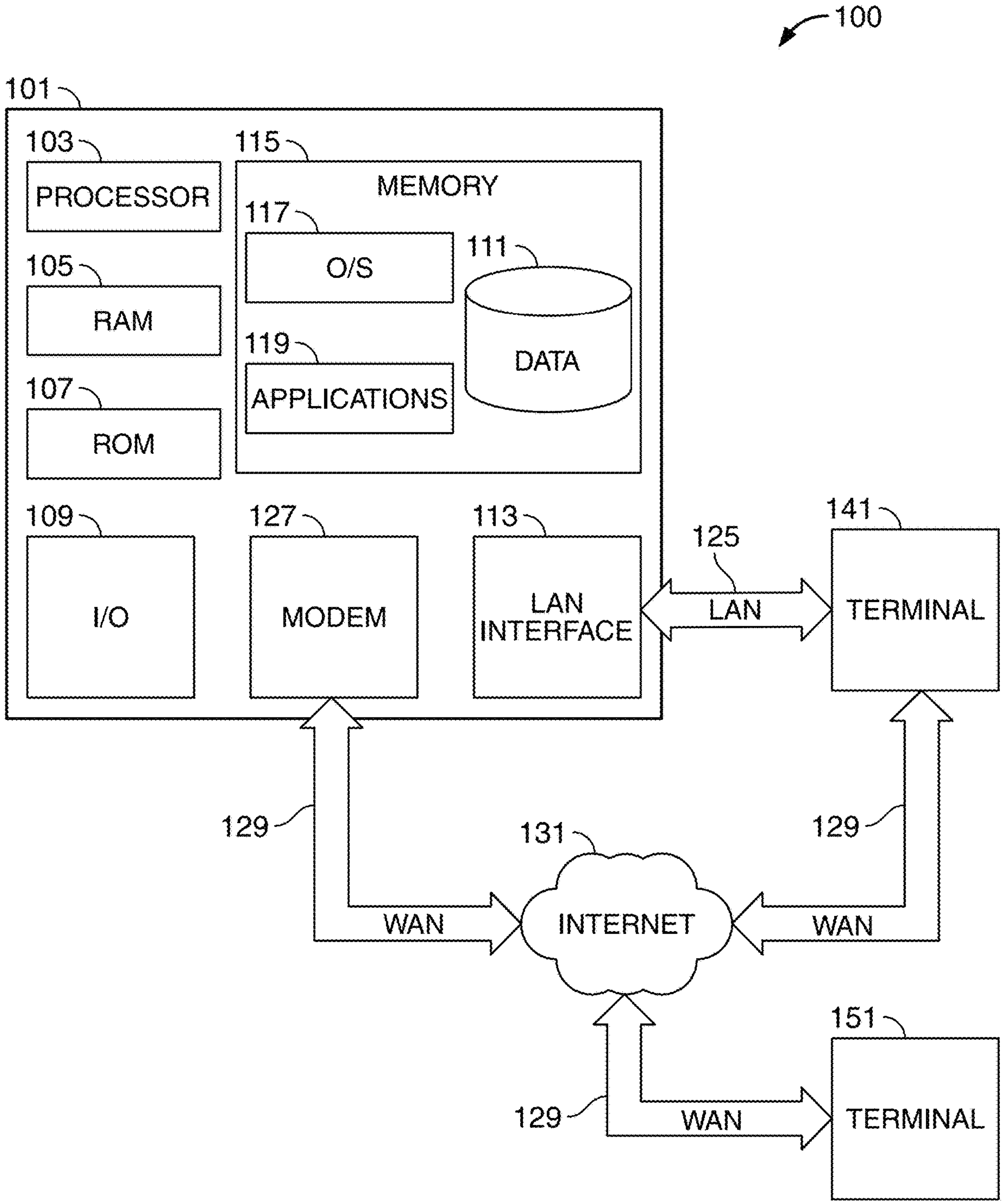
FIG. 1 shows an illustrative diagram in accordance with principles of the disclosure.

Systems, methods and apparatus for a multi-layer, auto-preventative and auto-reactive, cybersecurity system for auto-preventing cybersecurity intruders and auto-reacting to intrusions by cybersecurity intruders within a computing network environment is provided. The system may be located within the computing network environment. Because the system is operating within the network environment, there may be reduced latency when preventing intrusions and/or reacting to intruders.

The system may include a plurality of auto-preventative layers and a plurality of auto-reactive layers. The plurality of auto-preventative layers may include one or more auto-preventative layers. Each of the auto-preventative layers may prevent intruders from entering the environment. At times, one or more of the auto-preventative layers may operate in a collaborative approach. At other times, one or more of the auto-preventative layers may operate independently from one another. The plurality of auto-preventative layers may be operable to auto-prevent one or more intruders from entering the network environment. The auto-prevention may be activated upon identification of identity or authentication credentials of an intrusion attempt. The auto-prevention may be triggered upon detection of any suitable parameters associated with an intrusion attempt.

The plurality of auto-preventative layers may include creating or generating one or more intrusion prevention barriers within the computing network environment. The intrusion prevention barriers may ingest data. The ingested data may be data from within the computing network environment. The ingested data may be data extracted from one or more sources outside the computing network environment. Sources outside the computing environment may include third-party databases, web-crawlers and any other suitable sources. The intrusion prevention barriers may determine and authenticate an identity of the one or more intruders based on the ingested data from within the computing network environment and the data extracted from one or more sources outside the computing network environment.

The plurality of auto-reactive layers may include one or more auto-reactive layers. The one or more auto-reactive layers may auto-react to intruders once the intruders have entered the network. One or more layers included in the plurality of auto-reactive layers may operate on a quantum processor and associated memory storage.

Using the quantum processor and associated memory storage and using quantum computing processes, the plurality of auto-reactive layers may be operable to identify the one or more intruders. Using the quantum processor and associated memory storage and using quantum computing processes, the plurality of auto-reactive layers may be operable to isolate the one or more intruders within the computing network environment.

The plurality of auto-reactive layers may include an obscure data layer. The obscure data layer may generate and/or create an obscure data set. The obscure data set may map on a format of the data stored within a first segment of the computing an environment. The first segment of the computing network environment may be the segment of the computing environment in which the first intruder gained entry. Generation of the obscure data layer may be activated upon identification that a first intruder has been authenticated within the computing network environment. The obscure data set may include mocked-up data. The obscure data set may include simulated data.

The obscure data layer may also sever a connection between the first intruder and the first segment of the computing network environment. The connection between the first intruder and the first segment of the computing network environment may be a communication link. The communication link may be a wired communication link. The communication link may be a software communication link. The communication link may be a wireless communication link, such as, for example, Wi-Fi® or Bluetooth®. The communication link may be any other suitable communication link.

The obscure data layer may also generate an electronic auto-redirect. The electronic auto-redirect may automatically redirect the first intruder to a second segment of the computing network environment. The automatic redirect may be absent the first intruder's knowledge. As such, the first intruder may be unaware of the electronic transfer from the first segment of the computing network environment to the second segment of the computing network environment.

The second segment of the computing network environment may include a technical sandbox. As such, the second segment of the computing network environment may be a technical sandbox. The second segment of the computing network environment may store the obscure data set. The second segment of the computing network environment may monitor actions and/or communications of the first intruder during the first intruder's interactions with the technical sandbox. The second segment of the computing network environment may transmit the monitored interactions between the first intruder and the technical sandbox to a first auto-preventative layer. The first auto-preventative layer may be included in the plurality of auto-preventative layers.

The first auto-preventative layer may operate a generative artificial intelligence ("GenAI") model. The first auto-preventative layer may ingest the monitored interactions as training data to update a data set processed through the GenAI model. The first auto-preventative layer may operate the GenAI model. The GenAI model, trained on the data set, may auto-prevent one or more intruders from entering the computing network environment.

The first auto-preventative layer may identify one or more users attempting to gain access to the computing network environment. The first auto-preventative layer may determine, based on the GenAI model, that the one or more users are malicious users. The first auto-preventative layer may terminate one or more sessions associated with the one or more users.

Methods for auto-preventing cybersecurity intruders and auto-reacting to cybersecurity intruders within a computing network environment are provided. Methods may utilize a plurality of auto-preventative layers and a plurality of auto-reactive layers.

Methods may include auto-preventing, at one or more layers included in the plurality of auto-preventative layers, one or more intruders from entering the computing network environment. Methods may include, at one or more layers included in the plurality of auto-preventative layers, auto-generating one or more intrusion prevention barriers within the computing network environment. Methods may include, at one or more layers included in the plurality of auto-preventative layers, ingesting, at the one or more intrusion prevention barriers, a first data set from within the computing network environment. Methods may include, at one or more layers included in the plurality of auto-preventative layers, ingesting, at the one or more intrusion prevention barriers, a second data set extracted from one or more sources outside the computing network environment. Methods may include, at one or more layers included in the plurality of auto-preventative layers, determining and authenticating, at the one or more intrusion prevention barriers, an identity of the one or more intruders based on the first data set and the second data set.

Methods may include, at the plurality of auto-reactive layers, identifying, at a quantum processor, the one or more intruders. Methods may include, at the plurality of auto-reactive layers, isolating, at the quantum processor, the one or more intruders included within the computing network environment. Upon identification that a first intruder has been authenticated within the computing network environment, methods may include generating, at the quantum processor, at an obscure data layer, an obscure data set. The obscure data set may map on a format of the data stored within a first segment of the computing network environment in which the first intruder gained entry. The obscure data layer may be included in the plurality of auto-reactive layers.

Methods may include, at the plurality of auto-reactive layers, severing a connection between the first intruder and the first segment of the computing network environment. At times, the connection may be assumed, or replaced, with another connection, such as a connection with a second segment of the computing network environment.

Methods may include generating an electronic auto-redirect. The electronic auto-redirect may automatically redirect the first intruder, absent the first intruder's knowledge, to a technical sandbox. The technical sandbox may be the second segment of the computing network environment. The second segment of the computing network environment may store the obscure data set.

Methods may include monitoring, at the technical sandbox, actions and/or electronic interactions of the first intruder during the first intruder's interactions with the technical sandbox. Methods may also include transmitting the monitored interactions between the first intruder and the technical sandbox from the technical sandbox to a first auto-preventative layer. The first auto-preventative layer may be included in the plurality of auto-preventative layers.

Methods may include ingesting, at the first auto-preventative layer, via a generative artificial intelligence ("GenAI") model, the monitored interactions as training data to update the GenAI model. The GenAI model may be operable to auto-prevent intruders from entering the computing network environment. The GenAI model may also be operable to auto-terminate sessions with intruders upon entry into the computing network environment.

Auto-preventing intruders from entering the computing network environment may include identifying one or more users attempting to gain access to the computing network environment. Auto-preventing intruders from entering the computing network environment may also include determining that the one or more users are malicious users, the determining based on the GenAI model. Auto-preventing intruders from entering the computing network environment may also include terminating one or more sessions with the one or more users.

Illustrative method steps may be combined. For example, an illustrative method may include steps shown in connection with another illustrative method.

The steps of methods may be performed in an order other than the order shown or described herein. Embodiments may omit steps shown or described in connection with illustrative methods. Embodiments may include steps that are neither shown nor described in connection with illustrative methods.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone and/or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may include processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute software running on the computer. Other components commonly used for computers, such as EEPROM or flash memory or any other suitable components, may also be part of computer 101.

Memory 115 may include any suitable permanent storage technology, such as a hard drive. Memory 115 may store software including the operating system 117 and application program(s) 119 along with any data 111 needed for the operation of the system 100. Memory 115 may also store videos, text and/or audio assistance files. The data stored in memory 115 may also be stored in cache memory and/or any other suitable memory.

I/O module 109 may include connectivity to a microphone, keyboard, touch screen, mouse and/or stylus through which input may be provided into computer 101. The input may include input relating to cursor movement. The input/output module may also include one or more speakers for providing audio output and a video display device for providing textual, audio, audiovisual and/or graphical output. The input and output may be related to computer application functionality.

System 100 may be connected to other systems via a local area network ("LAN") interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include LAN 125 and a wide area network ("WAN") 129 but may also include other networks. When used in a LAN networking environment, computer 101 may connect to LAN 125 through LAN interface 113 or an adapter. When used in a WAN networking environment, computer 101 may include modem 127 or other means for establishing communications over WAN 129, such as Internet 131.

It will be appreciated if the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface ("API"). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory and/or any other suitable memory.

Additionally, application program(s) 119, which may be used by computer 101, may include computer executable instructions for invoking functionality related to communication, such as e-mail, Short Message Service ("SMS"), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered for the purposes of this application, as engines with respect to the performance of the particular tasks to which the programs are assigned.

Computer 101 and/or terminals 141 and 151 may also include various other components, such as a battery, speaker and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
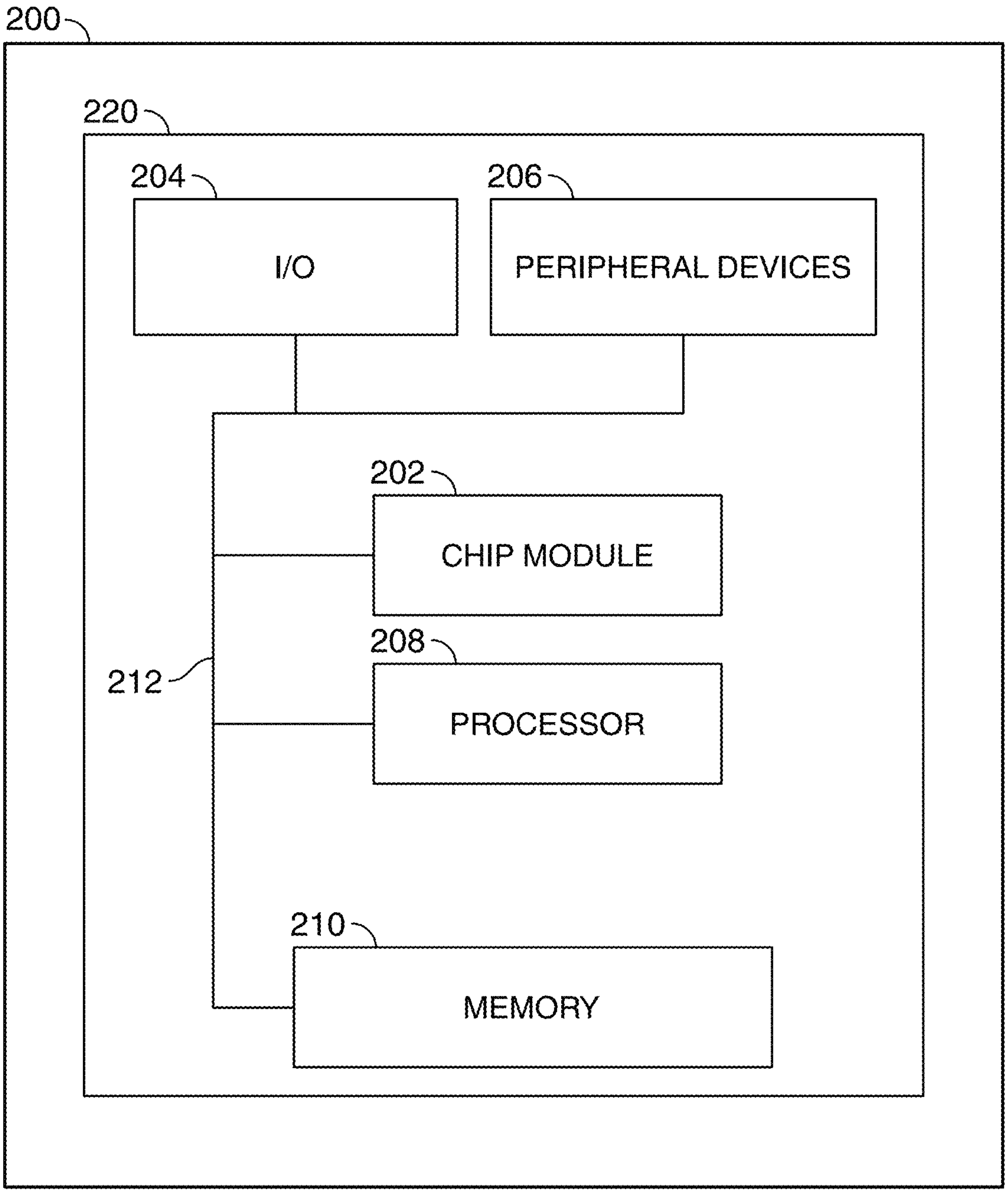
FIG. 2 shows another illustrative diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 1. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

Figure 3:
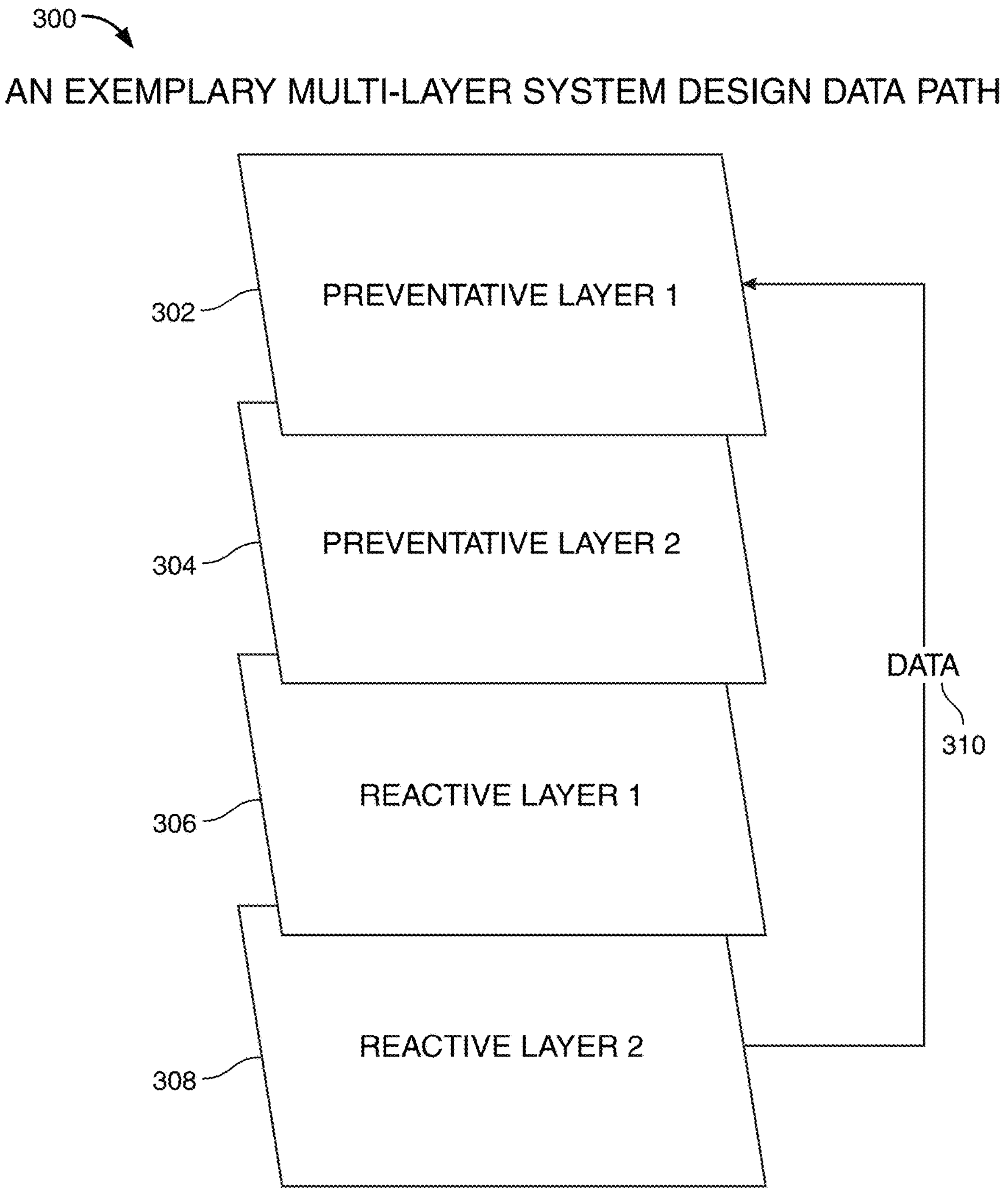
FIG. 3 shows yet another illustrative diagram in accordance with principles of the disclosure.

FIG. 3 shows an illustrative diagram. The illustrative diagram shows exemplary multi-layer system design data path 300. As shown at data path 300, a multi-layer system may include a plurality of layers. The layers may include preventative layer 1, shown at 302, preventative layer 2, shown at 304, reactive layer 1 shown at 306 and reactive layer 2, shown at 308.

Each of the preventative layers may operate to prevent intruders from entering a computing network. Each of the reactive layers may operate to react to intruders that have gained entry into the network. At times, each of both the preventative layers and reactive layers may operate independently of one another. Also, at times, one or more of the preventative layers and/or one or more of the reactive layers may collaborate to strengthen their ability to prevent and/or react to intruders. As such, as shown at data 310, data collected by reactive layer 2 may be passed to preventative layer 1. Therefore, preventative layer 1 may be updated with data to prevent future intrusions.

FIG. 4 shows another illustrative diagram. The illustrative diagram shows exemplary multi-layer system design data path 400. As shown at data path 400, a multi-layer system may include a plurality of layers. The layers may include preventative layer 1, shown at 402, preventative layer 2, shown at 404, reactive layer 1, shown at 406 and reactive layer 2, shown at 408.

Preventative layer 1, shown at 402, may use GenAI to create an updatable profile for intruders. Preventative layer 1, shown at 402, may also use GenAI to create an updatable profile for authentic users. In order to create the profile for intruders and authentic users, data 410 may be passed from reactive layer 2, shown at 408 to preventative layer 1.

Preventative layer 2, shown at 404, may use quantum computing to create preventative processes for intruders. Such preventative processes may include harnessing the speed of quantum computing to identify intrusion attempts in real-time.

Preventative layer 2, shown at 404, may also use quantum computing to create entry processes for authentic users. Such entry processes may include assigning authentic users one or more authentic quantum keys. The quantum keys may be used to authenticate a user at a data access point of the computing network. Preventative layer 2 may have created such authentic quantum keys in response to identification of intrusions. Such authentic quantum keys may effectively limit intruders from accessing data once the intruders have gained entry into the network.

Reactive layer 1, shown at 406, may use quantum computing to sever a connection between an intruder and a data segment. The connection may be severed in response to detection of an intruder. Reactive layer 1 may also replace the severed connection with a replacement connection. The replacement connection may connect the intruder to a technical sandbox.

Reactive layer 2, shown at 408, may identify intruders within a sandbox. Once an intruder has been identified, the intruder may be redirected to a technical sandbox. The technical sandbox may enable reactive layer 2 to record interactions between the intruder and the sandbox. The recorded interactions may be included in data 410, which is forwarded to preventative layer 1.

Figure 5:
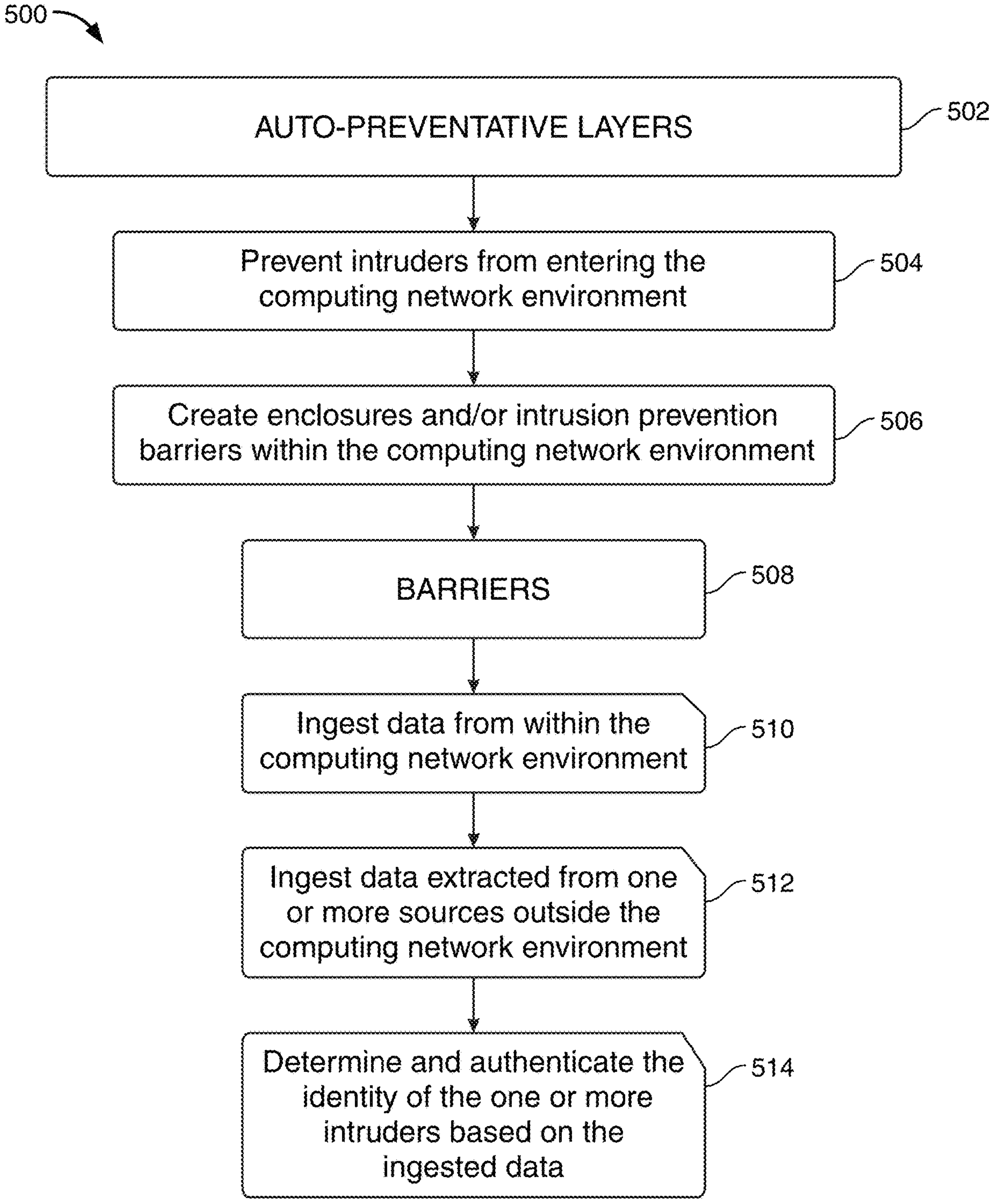
FIG. 5 shows an illustrative flow diagram in accordance with principles of the disclosure.

FIG. 5 shows an illustrative flow chart. Step 502 shows auto-preventative layers. Step 504 shows preventing intruders from entering the computing environment. Step 506 shows creating enclosures and/or intrusion prevention barriers within the computing network environment.

Step 508 shows barriers. Step 510 shows the barriers may ingest data from within the computing network environment. Step 512 shows the barriers may ingest data extracted from one or more sources outside the computing network environment. Step 514 shows the barriers may determine and authenticate the identity of the one or more intruders based on the ingested data.

Figure 6:
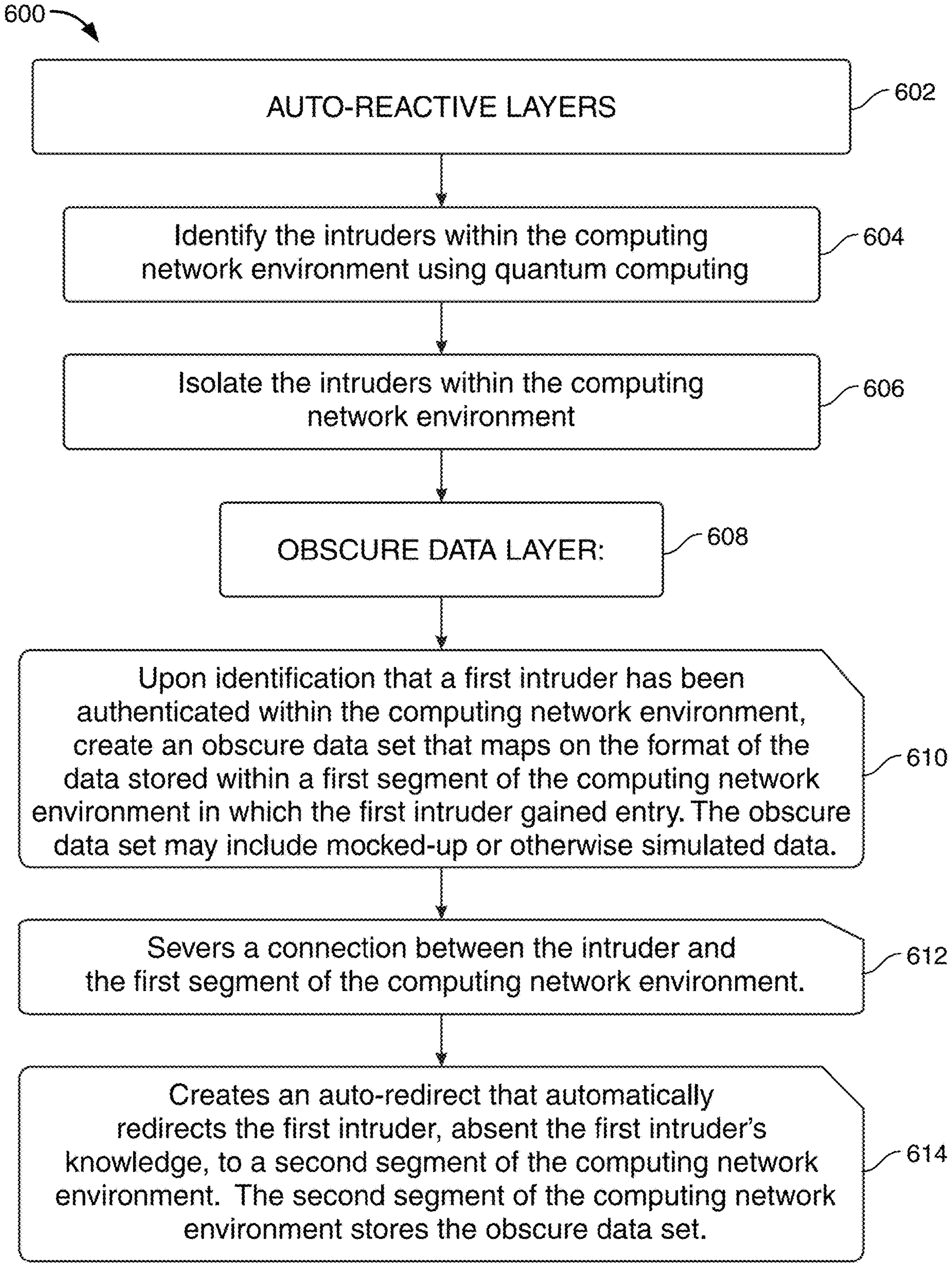
FIG. 6 shows another illustrative flow diagram in accordance with principles of the disclosure.

FIG. 6 shows an illustrative flow chart. Step 602 shows auto-reactive layers. Step 604 shows identifying the intruders within the computing network environment using quantum computing. Step 606 shows isolating the intruders within the computing network environment. Step 608 shows an obscure data layer.

Step 610 shows creating or generating an obscure data set upon identification that a first intruder has been authenticated within the computing network environment. The obscure data set may map on the format of the data stored within a first segment of the computing network environment. The first intruder may have gained entry into the first segment of the computing network environment. The obscure data set may include mocked-up data or otherwise simulated data.

Step 612 shows severing a connection between the intruder and the first segment of the computing network environment. Step 614 shows creating an auto-redirect that automatically redirects the first intruder, absent the first intruder's knowledge to a second segment of the computing network environment. The second segment of the computing network environment may store the obscure data set.

Thus, methods and apparatus for a GENERATIVE ARTIFICIAL INTELLIGENCE ("GenAI") CYBERSECURITY SYSTEM are provided. Persons skilled in the art will appreciate that the present disclosure can be practiced by other than the described embodiments, which are presented for purposes of illustration rather than of limitation and that the present disclosure is limited only by the claims that follow.

What is claimed is:

1. A method for auto-preventing cybersecurity intruders and auto-reacting to cybersecurity intruders within a computing network environment, the method comprising:

at a plurality of auto-preventative layers:

auto-preventing, at a layer included in the plurality of auto-preventative layers, one or more intruders from entering the computing network environment;

autogenerating one or more intrusion prevention barriers within the computing network environment;

ingesting, at the one or more intrusion prevention barriers, a first data set from within the computing network environment;

ingesting, at the one or more intrusion prevention barriers, a second data set extracted from one or more sources outside the computing network environment; and determining and authenticating, at the one or more intrusion prevention barriers, an identity of the one or more intruders based on the first data set and the second data set;

at a plurality of auto-reactive layers:

identifying, at a quantum processor, the one or more intruders;

isolating, at the quantum processor, the one or more intruders included within the computing network environment;

upon identification that a first intruder has been authenticated within the computing network environment, generating, at the quantum processor, at a simulated data layer, a simulated data set that maps on a format of the data stored within a first segment of the computing network environment in which the first intruder gained entry;

severing a connection between the first intruder and the first segment of the computing network environment; and generating an electronic auto-redirect, said electronic auto-redirect automatically redirects the first intruder, absent the first intruder's knowledge, to a second segment of the computing network environment, the second segment of the computing network environment storing the simulated data set.

2. The method of claim 1 wherein the second segment of the computing network environment is a technical sandbox.

3. The method of claim 2 further comprising:

at the technical sandbox:

monitoring actions of the first intruder during the first intruder's interactions with the technical sandbox; and transmitting the monitored interactions between the first intruder and the technical sandbox to a first auto-preventative layer, said first auto-preventative layer included in the plurality of auto-preventative layers;

at the first auto-preventative layer:

ingesting via a generative artificial intelligence ("GenAI") model, the monitored interactions as training data to update the GenAI model, said GenAI model operable to:

auto-prevent intruders from entering the computing network environment; and auto-terminate sessions with intruders upon entry into the computing network environment.

4. The method of claim 1 further comprising auto-preventing intruders from entering the computing network environment by:

identifying one or more users attempting to gain access to the computing network environment;

determining that the one or more users are malicious users, the determining based on the GenAI model; and terminating one or more sessions with the one or more users.

5. The method of claim 1 wherein the simulated obscure data set comprises mocked-up data.

6. The method of claim 1 wherein the plurality of auto-reactive layers comprises the simulated data layer.

7. A method for auto-preventing cybersecurity intruders and auto-reacting to cybersecurity intruders within a computing network environment, the method comprising:

at a plurality of auto-preventative layers:

auto-preventing, at a layer included in the plurality of auto-preventative layers, one or more intruders from entering the computing network environment;

autogenerating one or more intrusion prevention barriers within the computing network environment;

ingesting, at the one or more intrusion prevention barriers, a first data set from within the computing network environment;

ingesting, at the one or more intrusion prevention barriers, a second data set extracted from one or more sources outside the computing network environment; and determining and authenticating, at the one or more intrusion prevention barriers, an identity of the one or more intruders based on the first data set and the second data set;

at a plurality of auto-reactive layers:

identifying, at a quantum processor, the one or more intruders;

isolating, at the quantum processor, the one or more intruders included within the computing network environment;

upon identification that a first intruder has been authenticated within the computing network environment, generating, at the quantum processor, at a simulated data layer, a simulated data set that maps on a format of the data stored within a first segment of the computing network environment in which the first intruder gained entry;

severing a connection between the first intruder and the first segment of the computing network environment; and generating an electronic auto-redirect, said electronic auto-redirect automatically redirects the first intruder, absent the first intruder's knowledge, to a technical sandbox, said technical sandbox being a second segment of the computing network environment, the second segment of the computing network environment storing the simulated data set;

at the technical sandbox:

monitoring actions of the first intruder during the first intruder's interactions with the technical sandbox; and transmitting the monitored interactions between the first intruder and the technical sandbox to a first auto-preventative layer, said first auto-preventative layer included in the plurality of auto-preventative layers;

at the first auto-preventative layer:

ingesting via a generative artificial intelligence ("GenAI") model, the monitored interactions as training data to update the GenAI model, said GenAI model operable to:

auto-prevent intruders from entering the computing network environment; and auto-terminate sessions with intruders upon entry into the computing network environment.

8. The method of claim 7 further comprising auto-preventing intruders from entering the computing network environment by:

identifying one or more users attempting to gain access to the computing network environment;

determining that the one or more users are malicious users, the determining based on the GenAI model; and terminating one or more sessions with the one or more users.

9. The method of claim 7 wherein the simulated data set comprises mocked-up data.

10. The method of claim 7 wherein the plurality of auto-reactive layers comprises the simulated data layer.

* * * * *